(12) United States Patent
Lindbergh

(10) Patent No.: US 8,274,543 B2
(45) Date of Patent: Sep. 25, 2012

(54) TAG-AWARE MULTIPOINT SWITCHING FOR CONFERENCING

(75) Inventor: David Jordan Lindbergh, Reading, MA (US)

(73) Assignee: Polycom, Inc., San Jose, CA (US)

( * ) Notice: Subject to any disclaimer, the term of this patent is extended or adjusted under 35 U.S.C. 154(b) by 1424 days.

(21) Appl. No.: 11/772,687

(22) Filed: Jul. 2, 2007

(65) Prior Publication Data

US 2009/0009587 A1 Jan. 8, 2009

(51) Int. Cl.
*H04M 11/00* (2006.01)

(52) U.S. Cl. ..................... 348/14.01; 709/204

(58) Field of Classification Search ...... 348/14.1–14.09, 348/14.11–14.13, 14.16; 709/207, 232, 250, 709/204, 231, 236, 246
See application file for complete search history.

(56) References Cited

U.S. PATENT DOCUMENTS

| | | | |
|---|---|---|---|
| 6,704,769 B1 * | 3/2004 | Comstock et al. | 709/204 |
| 6,744,460 B1 * | 6/2004 | Nimri et al. | 348/14.11 |
| 6,876,379 B1 * | 4/2005 | Fisher | 348/14.02 |
| 7,139,807 B2 * | 11/2006 | Comstock et al. | 709/207 |
| 7,355,619 B2 * | 4/2008 | Motohashi | 348/14.02 |
| 7,492,729 B2 * | 2/2009 | Shaffer et al. | 370/260 |
| 7,533,146 B1 * | 5/2009 | Kumar | 709/205 |
| 7,692,683 B2 * | 4/2010 | Kenoyer et al. | 348/14.08 |
| 2006/0152577 A1 * | 7/2006 | Hagendorf et al. | 348/14.01 |
| 2007/0291108 A1 * | 12/2007 | Huber et al. | 348/14.02 |
| 2008/0068449 A1 * | 3/2008 | Wu et al. | 348/14.09 |
| 2008/0266411 A1 * | 10/2008 | Crinon et al. | 348/222.1 |
| 2009/0222572 A1 * | 9/2009 | Fujihara | 709/232 |

* cited by examiner

*Primary Examiner* — Curtis Kuntz
*Assistant Examiner* — Maria El-Zoobi
(74) *Attorney, Agent, or Firm* — Wong, Cabello, Lutsch, Rutherford & Brucculeri, L.L.P.

(57) ABSTRACT

Conferencing methods and systems are disclosed wherein tags are associated with conferencing endpoints. The tags provide information enabling a decision-making entity to determine the preferability of one or more processing aspects of the endpoints. In a multipoint conference a tag can allow a decision making entity such as an MCU to determine the most appropriate mode for rendering video or other signals sent from a tagged endpoint. The tag itself can indicate the most appropriate mode or can contain information from which the decision-making entity can determine the most appropriate mode using an algorithm. A tag can be associated with an endpoint manually, for example based on a user's or controller's inputs concerning the endpoint. Alternatively, the tag can be assigned automatically based on automatically sensing one or more conditions at an endpoint or analyzing one or more parameters of a data stream transmitted from the endpoint.

27 Claims, 1 Drawing Sheet

TAG-AWARE MULTIPOINT SWITCHING FOR CONFERENCING

BACKGROUND

1. Field

The disclosure relates to videoconferencing and more specifically to processing a data stream from a multipoint videoconferencing endpoint. A method of associating a tag with an endpoint or video source in a multipoint videoconference and processing data from the tagged endpoint or video source in accordance with the tag is disclosed.

2. Description of the Related Art

Two viewing modes are commonly utilized for multi-point videoconferencing: (1) continuous presence mode (CP) (a.k.a. "Hollywood Squares"), wherein images of multiple conference endpoints are displayed simultaneously, with each image occupying a separate region of the display area; and (2) full screen, wherein the image of a single endpoint or video source, usually corresponding to the currently or most recently speaking participant, is displayed using all or most of the display area at the receiving site, resulting in a relatively larger and more detailed picture, on which each person at the far-end site can be seen more clearly. FIG. 1 illustrates an example of CP mode layout wherein four conferees can be simultaneously presented in sub-regions 101-104. Videoconferencing modes are described in detail in ITU-T Recommendation H.243. Each of these modes has inherent advantages and limitations. For example, CP works well when each site has only one or a few (e.g., up to three) people present because the smaller images in each sub-region of the CP display are still large and detailed enough to provide adequate representation of facial expressions, body language, etc. of the participants. However, when one or more sites have many people (e.g., six or more people around a conference table), or if a site is presenting written or graphical data, such as a marker board, chart, graph, computer display, etc., CP mode is less effective because the small sub-regions of the layout do not allow sufficient size and detail for good viewing of these sites. For example, the image of each person is so small, and/or has such lack of detail that facial expressions, body language etc. are difficult or impossible to distinguish. Such sites are more suitable to be displayed in full screen so that the people and/or data at the site can be seen in better detail. One disadvantage of full screen is that the other participating sites can not be seen simultaneously, so there is no opportunity to observe the reaction of the other participants to what is being seen.

Existing multipoint videoconferencing solutions are typically "modal," i.e., a conference can either be conducted in CP mode or in full screen, but not generally in a mixture of both. There are in the art examples of switching between full screen mode and CP mode in the same conference depending on the dynamics of the conference, for example, using CP mode if there is discussion involving multiple endpoints but using full screen if only one endpoint is active. One such solution is described in U.S. Pat. No. 6,744,460, the entire contents of which are hereby incorporated herein by reference.

Commonly assigned U.S. Pat. Nos. 6,704,769 and 7,139,807, the entire contents of which are hereby incorporated by reference, describe labeling media streams in a videoconference with a role that describe the function or purpose of the stream, such as "people" or "content." A policy manager is provided for managing roles, so that the media streams may be more effectively presented to participants based on the role of the stream.

While processing a media stream based on its role is an improvement over the typical modal presentation available for videoconferencing, a further improvement would be provided by further defining an optimal or preferred display mode for individual endpoints and for automatically and dynamically switching to the appropriate mode depending on which endpoint(s) are to be displayed. For example, two different streams having the same role may be most optimally displayed in different modes.

SUMMARY

The present disclosure provides videoconferencing methods wherein tags may be associated with one or more media streams, video sources, and/or one or more endpoints in a multipoint videoconference. The tag may relate to one or more aspects of how data coming from the tagged endpoint should be processed or what type of data should be sent to the tagged endpoint. In one embodiment, a tag is indicative of how video coming from the tagged endpoint should be displayed. For example, the tag can indicate whether video from the tagged endpoint should be displayed in CP or full screen. The tag may also indicate a minimum size screen, number of pixels, or resolution required to adequately display video from the tagged endpoint or may indicate the number of people present at the endpoint.

Tags may inform a decision-making entity within a videoconferencing system of one or more properties of the tagged endpoint, better enabling decisions with regard to the endpoint. For example, the tag can indicate to the decision-making entity the mode most appropriate for displaying video from the endpoint, or the tag can provide the decision-making entity with information concerning the endpoint that permits the decision-making entity to decide the proper mode.

In a multipoint videoconferencing system using an MCU, the MCU can be the decision-making entity. In one embodiment, the MCU executes an algorithm that uses a tag associated with an endpoint to determine the mode the MCU should use to transmit video data from that endpoint to other endpoints in the videoconference. In videoconferences not using an MCU, the endpoints themselves can be the decision-making entities. Alternatively, some other control point can be the decision-making entity.

DETAILED DESCRIPTION

Figure 1:
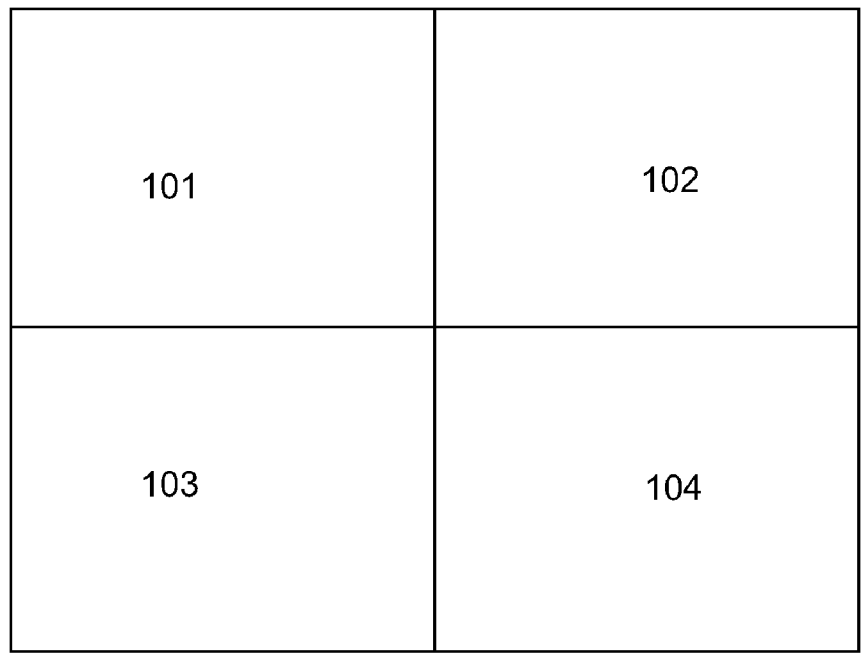
FIG. 1 illustrates a continuous presence mode (CP) in a videoconference.

For ease of discussion, the present description will focus on two endpoints in a multipoint conference containing three endpoints: an endpoint at which the current speaker is present, and two receiving endpoints. It will be appreciated that there can be any number of endpoints (greater than one) involved in a videoconference and that at any given time there many be no endpoints at which someone is speaking, one endpoint at which someone is speaking, or multiple endpoints at which people are speaking simultaneously. As used herein, the term "speaking endpoint" refers to the endpoint at which a presently speaking conferee is located. Which endpoints are speaking at any given time can change throughout the duration of the videoconference. Each endpoint may be associated with its one or more tags, or some endpoints may be associated with tags while others have no tag, or a given single tag may be associated with multiple endpoints.

The present disclosure is directed to methods and systems for videoconferencing wherein one or more endpoints in a videoconference have associated therewith a tag that may be used to inform a decision-making entity about some aspect of the tagged endpoint. The tag may contain information about the viewability of images transmitted by the endpoint. For example, the tag can inform a decision-making entity how video from the endpoint would best be displayed in a conference layout, i.e., whether the endpoint would best be displayed in continuous presence (CP) mode or full screen. It is noted that factors beside which mode is "best" may come into the ultimate decision about display mode. While one mode may be "best" for a given endpoint, other factors may conflict with this "best" mode, necessitating a compromise decision.

Tags, according to the present disclosure, contain information concerning the images transmitted by a media stream that informs a decision making entity's determination of how the images should be displayed in a videoconference layout. Tags differ from the role labels described in U.S. Pat. Nos. 6,704,769 and 7,139,807 in that tags convey information about the viewability of images conveyed by the stream regardless of what role the stream plays in the videoconference. The tag may indicate, for example, that the particular content images conveyed by a content data stream are easily viewable in a small window and are thus appropriate for display in CP mode. Alternatively, a tag may indicate that the content should be displayed in full screen mode if the content would be difficult to view were it displayed in CP mode.

A tag may be associated with a stream instead of a role label or in addition to a role label. A decision making entity may use the tag information, possibly along with role labels and other criteria, to determine how the tagged images should be displayed.

A tag may be a single bit conveying a yes/no signal concerning a particular property of an endpoint. For example, the yes/no bit may indicate whether the speaking endpoint can be usefully displayed in CP mode. Alternatively, the tag may convey other or more detailed information concerning the endpoint. The tag may indicate, for example, how many people are at the endpoint or whether graphical/written data is displayed at the endpoint, for example. Tags are discussed in more detail below.

The tag can inform a decision-making entity of one or more properties of the tagged endpoint, enabling the decision-making entity to make a decision concerning a particular aspect of the endpoint. The decision-making entity can be any device or combination of devices that makes a decision concerning the videoconference. For example, if the videoconference is conducted using a multipoint conferencing unit (MCU), the MCU can be the decision-making entity.

As is known in the art, an MCU typically receives audio/video streams from each of the endpoints, processes the streams, and sends audio/video streams to each of the participating endpoints. For example, a MCU may combine the received video streams and send the combined streams to the participating endpoints. The video stream sent to an endpoint typically includes the videoconference layout that will be viewed at that endpoint. The video stream sent by an MCU can include either a CP or full screen presentation of the conference to be displayed at the receiving endpoint(s). Multiple MCUs can be used, particularly for videoconferences having many participants. Such cascaded arrangements are known in the art.

A tag may be associated with a video stream either at the endpoint originating the stream, at an MCU, or at some other node on a network. The MCU may use tag information to make a decision concerning what type of audio/video stream to send to the receiving endpoint(s). For example, the MCU may determine from a tag associated with an endpoint whether the endpoint is best displayed in CP or full screen and, in response, send the appropriate mode stream to other endpoint(s) when that endpoint is speaking. The MCU may execute an algorithm to determine from the tag information, and possibly taking into account other information, how to send video originating from the speaking endpoint. If the algorithm determined that the speaking endpoint should be displayed in CP mode, the MCU sends data to the receiving endpoint in CP mode. If the algorithm determined that CP mode is inappropriate for displaying the speaking endpoint, the MCU may send full screen data to the receiving endpoint. We note that any endpoint can be displayed in any mode; the tag contains information concerning which mode is best.

The tag can vary in detail with regard to the amount of information it includes. Additionally, the algorithm can vary with regard to sophistication. In one embodiment, the tag is simply a yes/no bit indicating whether or not the video from the endpoint is suitable for display in CP mode. The tag is not based on the role data from the endpoint plays in a conference, i.e., whether it contains people or content data for example, but rather can convey additional information to allow a decision making entity decide how to process the data. For example, video conference might be configured such that content images are displayed in full screen mode and people images are displayed in CP mode. However, a tag may be associated with a stream transmitting content images indicating that the stream is suitable for display in CP, thereby instructing the decision making entity to override the policy of always displaying content in full screen mode.

Alternatively, the tag might indicate the minimum resolution necessary to meaningfully display the content images. Thus, a decision making entity can decide, based on the tag and the capabilities of a receiving endpoint, whether to send a CP or a full screen presentation to an endpoint. Still alternatively, a tag may indicate how long content data must be displayed in the highest resolution possible. According to such an embodiment, a decision making entity might send content data to an endpoint in full screen mode for a period of time and then switch to CP mode.

Tags can also inform the processing of video streams containing images of people. For example, a video conferencing session may be configured such that people images are displayed in CP mode by default. However, a tag may be associated with one or more streams conveying people images that overrides the default configuration and displays those particular streams in full screen mode. Such a tag might be appropriate when the particular stream contains images of unusually large numbers of people, or of especially important people. Alternatively, the tag may indicate the number of participants at the endpoint. The decision making entity may execute an algorithm that uses the number of participants at an endpoint to decide whether to send video from that endpoint as CP or full screen. For example, if the number of people at a particular endpoint is greater than three, the decision making entity may decide to send video from that endpoint as full screen. Thus, the tag may convey information concerning the number of people at a given endpoint or the number of people whose images are contained in video from that endpoint. Alternatively, the tag may be a single flag bit signaling "showing this site (or stream) in CP is preferred" vs. "showing this site (or stream) in full-screen is preferred." The tag may convey other information as well—the mentioned information is exemplary.

As another alternative, the tag may specify the smallest display size that can usefully display the endpoint in sufficient detail. For example, the tag might specify the smallest number of pixels, the least units of angle (e.g. degrees subtended by the display as seen from the viewer's position), or the smallest screen size (e.g., in linear dimension—inches or meters, or area dimension—square inches or square meters) that can adequately display the image sent from that endpoint. An MCU may execute an algorithm that uses such information, along with information concerning the display screen at the receiving endpoint, to decide if displaying video from the speaking endpoint in CP mode will result in the image having a sufficiently large size. If the resulting image size in CP mode will be adequate, the MCU may send the video from the speaking endpoint in CP mode. If the resulting image will be too small, the MCU can send the video in full screen. It is within the ability of one of skilled in the art to arrive at additional algorithms for utilizing tag information to inform a decision concerning how to present audio/video data from a particular endpoint and to arrive at additional or alternative descriptive information concerning the characteristics and capabilities of the endpoints which may usefully be conveyed in tags.

The tag can be communicated between endpoints and the decision-making entity in any of numerous ways. For example, the tag can be communicated in a portion of a data stream that communicates control signals among the components of the videoconferencing system. Alternatively, tags can be communicated in the portion of a data stream that transmits video, audio, or any other data. In yet another alternative, tags can be communicated using a separate channel from the rest of the conference data.

In one embodiment, the tags can be set by the users at each endpoint, for example, via a user interface of the video conferencing system. On setting up a video conference, users or conference administrators might be asked a series of questions, such as how many participants are present at that conferencing site, if they are presenting written or graphical data, etc. Tags reflecting how the sites should best be presented can be attached to the site based on answers to these questions. The tag can be attached to the site on a conference-by-conference basis, i.e., the tags can be reset for each conference. Alternatively, the tags can be set and maintained until they are updated, i.e., on a semi-permanent basis.

Alternatively, tags may be set at the MCU or at some other control point in a videoconferencing system, by an operator or administrator, for example. In one embodiment, an administrator views a video feed of the conference and set tags based on the administrator's view of the participants at each of the endpoints. Alternatively, the tags may be set in response to information provided when scheduling a videoconference in advance. Tags may be set in response to information given to a human conference administrator or alternatively in response to information provided to an automated videoconference scheduling application.

In another alternative, tags can be set automatically, for example by sensing the number of people present at an endpoint. In one embodiment, the number of people can be sensed using automatic detection of faces, voices, etc. Such detection can be performed either by the endpoint or by an MCU via analysis of the video and/or audio data stream. Alternatively, automatic detection of people may be performed using sensors such as seat switches, worn tags (RFID, infrared, acoustic), etc. The number of people may be detected or estimated automatically based on other factors such as the size of the room, the acoustic echo time of the room, focal distance, or other methods known in the art.

A given endpoint may have more than one video source (more than one camera, or cameras plus one or more presentation sources such as a VCR, DVD, or PC etc.). In such cases a tag may be assigned to each video source and not just each endpoint. For example, at a site with one person plus a content source, the "people" camera might be associated with tags concerning how to best display the people and the content source might be associated with tags concerning how to best display the content. Videoconference endpoints can have more than one camera or more than one video mode. In such cases separate tags can be useful for each camera or video mode.

Figure 2:
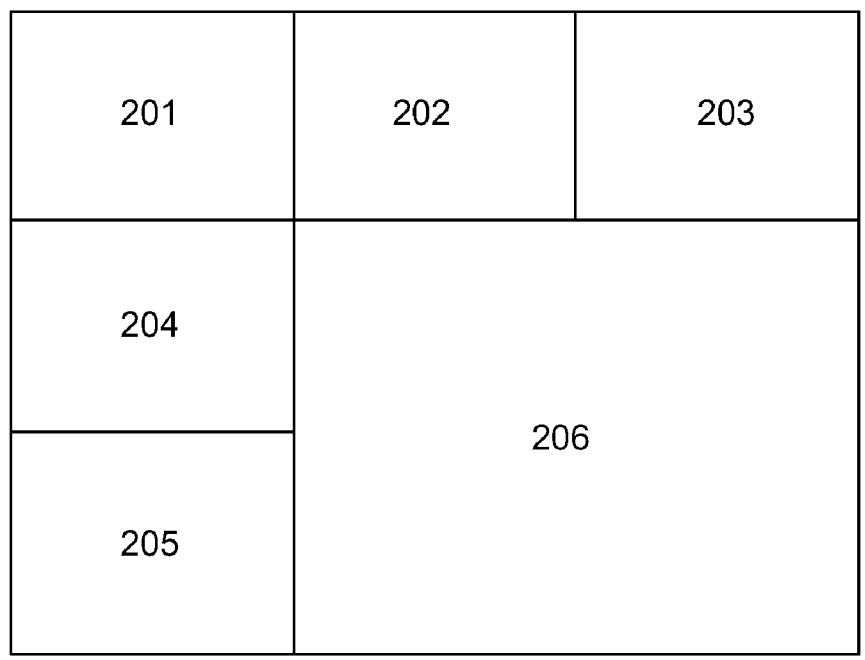
FIG. 2 illustrates a CP mode having different sized sub-regions.

Some videoconferencing systems support more than one CP mode. Some CP modes simultaneously utilize display regions having different sizes and/or aspect ratios. FIG. 2 illustrates such a CP mode having small sub-regions 201-205 and one large sub-region 206. Generally, sub-region 206 is used by a speaking endpoint. For example, images from a particular endpoint might not be suitable for display in a CP mode that uses only small, equal sized sub-regions but a CP mode having a large sub-region such as 206 might be adequate to display the same endpoint. In a CP mode according to FIG. 2, a tag may force a particular endpoint to always be displayed in a large display region 206.

The disclosure has focused primarily on using tags to inform a decision-making entity how to display a video stream from an endpoint in videoconference. However, according to the disclosed method, a tag can be used to inform any decision about the processing of a video stream and may be used to inform the handling of audio, text, or other streams as well. For example, if one endpoint in an audio conference was the site where the chairman of the meeting was present, a tag marking that endpoint as the chairman's site may be used to cause a tone to sound when the chairman spoke, to indicate his status to remote listeners.

The disclosed method can be implemented in digital electronic circuitry, or in computer hardware, firmware, software, or in combinations of them. For example, software implementations can include third party add-ins, etc. and can also be implemented as hardware, firmware, etc., as mentioned above. Apparatus of the disclosure can be implemented in a computer program product tangibly embodied in a machine-readable storage device for execution by a programmable processor; and method steps of the disclosure can be performed by a programmable processor executing a program of instructions to perform functions of the method by operating on input data and generating output. The method can be implemented advantageously in one or more computer programs that are executable on a programmable system including at least one programmable processor, coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; flash memory devices, and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM, DVD-ROM, HD-DVD, and BlueRay disks. Any of the foregoing can be supplemented by, or incorporated in, ASICs (application-specific integrated circuits) or FPGAs.

A number of implementations of the disclosed methods and apparatus have been described. Nevertheless, it will be understood that various modifications may be made without departing from the spirit and scope of the invention. Accordingly, other implementations are within the scope of the following claims.

I claim:

1. A method of conducting a videoconference, comprising:
    associating a tag with a data stream, the tag containing information about optimal viewing parameters for images transmitted by the data stream, including at least one item selected from the group consisting of:
    least units of angle as seen from a viewer's position that can adequately display video contained by the data stream;
    smallest display area adequate to display video contained in the data stream minimum number of pixels adequate to display video contained in the data stream;
    making a decision at a decision-making entity about how the data stream should be processed, wherein the decision is at least in part based on information provided by the tag; and
    processing the data stream in accordance with the decision.

2. The method of claim 1, wherein the tag indicates a preferred mode of viewing video contained by the data stream.

3. The method of claim 1, wherein the tag indicates a number of participants at an endpoint from which the data stream is sent.

4. The method of claim 1, wherein the tag contains information related to at least one of voice or image recognition analysis of video contained by the data stream.

5. The method of claim 1, wherein the tag contains information provided by a user at an endpoint from which the data stream originates.

6. A method of conducting a videoconference, comprising:
    associating a tag with a data stream, the tag containing information about optimal viewing parameters for images transmitted by the data stream, wherein the tag contains information related to at least one of:
    image recognition analysis of video contained by the data stream, or voice recognition analysis of audio contained by the data stream;
    making a decision at a decision-making entity about how the data stream should be processed, wherein the decision is at least in part based on information provided by the tag; and
    processing the data stream in accordance with the decision.

7. The method of claim 6, wherein the tag indicates a number of participants at an endpoint from which the data stream is sent.

8. A method of conducting a videoconference, comprising:
    associating a tag with a data stream, the tag containing information about optimal viewing parameters for images transmitted by the data stream, wherein the tag contains information in response to automatic sensing of a number of participants at an endpoint from which the data stream originates;
    making a decision at a decision-making entity about how the data stream should be processed, wherein the decision is at least in part based on information provided by the tag; and
    processing the data stream in accordance with the decision.

9. The method of claim 1, wherein the tag indicates whether video contained in the data stream comprises graphical data or written data.

10. The method of claim 1, wherein the decision-making entity is a multipoint control unit (MCU).

11. The method of claim 1, wherein the decision-making entity is an endpoint.

12. The method of claim 1, wherein the decision-making entity is an intermediate processing point.

13. A method of processing a data stream of an endpoint in a videoconferencing system, the method comprising:
    associating a tag with the endpoint, wherein the tag contains information concerning how images from the endpoint should be displayed in a videoconferencing layout based on optimal viewing parameters and wherein the tag comprises a single bit of information; and
    executing an algorithm that considers the information contained in the tag to inform a decision about the processing of a media stream.

14. A method of processing a data stream of an endpoint in a videoconferencing system, the method comprising:
    associating a tag with the endpoint, wherein the tag contains information concerning how images from the endpoint should be displayed in a videoconferencing layout based on optimal viewing parameters and wherein the tag indicates whether the video contained in the data stream is suitable to be displayed in continuous presence (CP) mode; and
    executing an algorithm that considers the information contained in the tag to inform a decision about the processing of a media stream.

15. A method of processing a data stream of an endpoint in a videoconferencing system, the method comprising:
    associating a tag with the endpoint, wherein the tag contains information concerning how images from the endpoint should be displayed in a videoconferencing layout based on optimal viewing parameters and wherein the tag is indicative of a number of participants at the endpoint; and
    executing an algorithm that considers the information contained in the tag to inform a decision about the processing of a media stream.

16. A method of conducting a videoconference, comprising:
    receiving a data stream from an endpoint, wherein the data stream is associated with a tag indicating the number of participants at the endpoint;
    making a decision at a decision-making entity about how the data stream should be processed, wherein the decision is at least in part based on information provided by the tag, wherein the decision is whether images transmitted by the data stream are suitable to be displayed in continuous presence mode and if the number of participants is greater than a threshold number, the images are not suitable to be displayed in continuous presence mode; and
    processing the data stream in accordance with the decision.

17. The method of claim 16, wherein the number of participant at the endpoint is automatically determined by sensing the presence of the participants at the endpoint.

18. The method of claim 16, wherein the number of participants at the endpoint is determined by analyzing images transmitted by the data stream.

19. The method of claim 16, wherein the number of participants at the endpoint is provided manually by a user.

20. A system for conducting a videoconference, comprising:
an encoder adapted to:
receive a data stream generated by an endpoint, the data stream having a tag containing information about optimal viewing parameters for images conveyed by the data stream, including at least one item selected from the group consisting of:
least units of angle as seen from a viewer's position that can adequately display video contained by the data stream;
smallest display area adequate to display video contained in the data stream; and
minimum number of pixels adequate to display video contained in the data stream; and
encode the images conveyed by the data stream into a videoconferencing stream, wherein the encoding is at least in part based on information provided by the tag.

21. The system of claim 20, wherein the tag indicates a preferred mode of viewing video contained by the data stream.

22. The system of claim 20, wherein the tag indicates a number of participants at an endpoint from which the data stream is sent.

23. The system of claim 20, wherein the tag contains information provided by a user at an endpoint from which the data stream originates.

24. The system of claim 20, wherein the tag contains information generated by image recognition analysis of video contained by the data stream.

25. A system for conducting a videoconference, comprising:
an encoder adapted to:
receive a data stream generated by an endpoint, the data stream having a tag containing information about optimal viewing parameters for images conveyed by the data stream, wherein the tag contains information in response to automatic sensing of a number of participants at an endpoint from which the data stream originates; and
encode the images conveyed by the data stream into a videoconferencing stream, wherein the encoding is at least in part based on information provided by the tag.

26. The system of claim 20, wherein the tag indicates whether video contained in the data stream comprises graphical data or written data.

27. The system of claim 25, wherein the tag contains information generated by image recognition analysis of video contained by the data stream.

* * * * *